O. B. KENT & C. W. WATERS.
TRAIN PIPE COUPLING.
APPLICATION FILED JUNE 5, 1913.
1,112,144.
Patented Sept. 29, 1914.
2 SHEETS—SHEET 2.
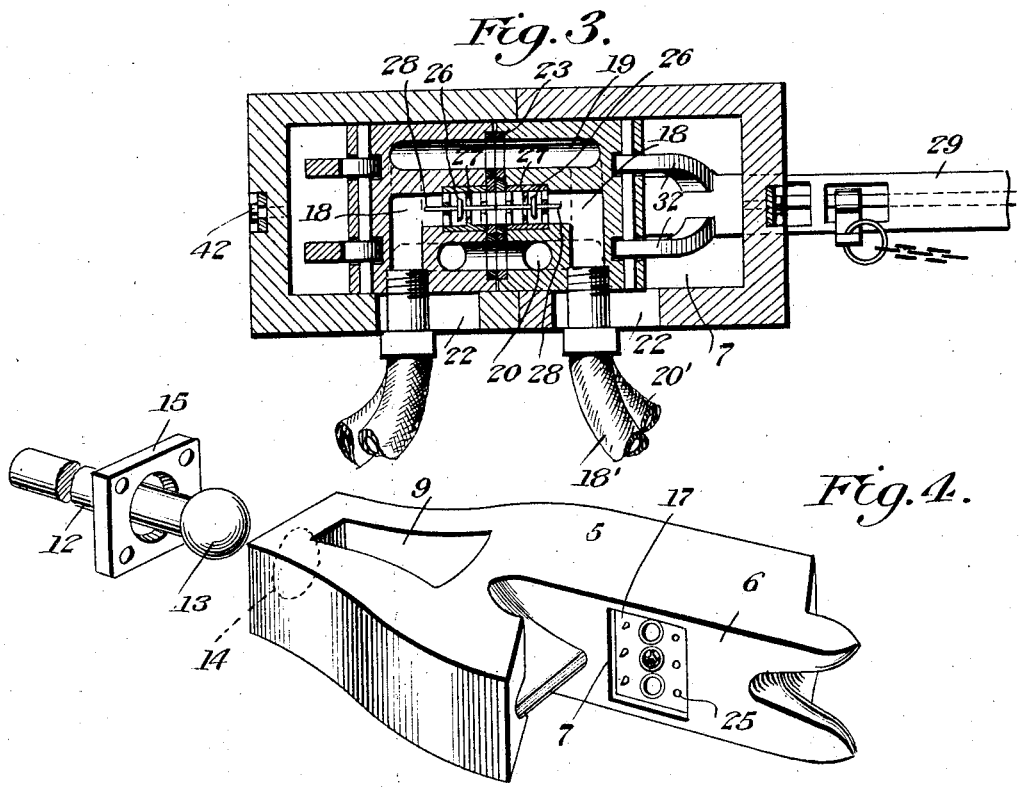
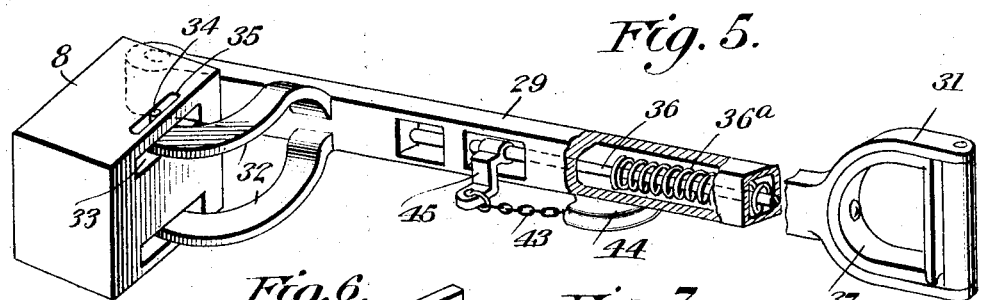
Witnesses
Geo. Ackman Jr.
C. C. Hines.
Inventors
Otis B. Kent
Charles W. Waters
By
Attorney

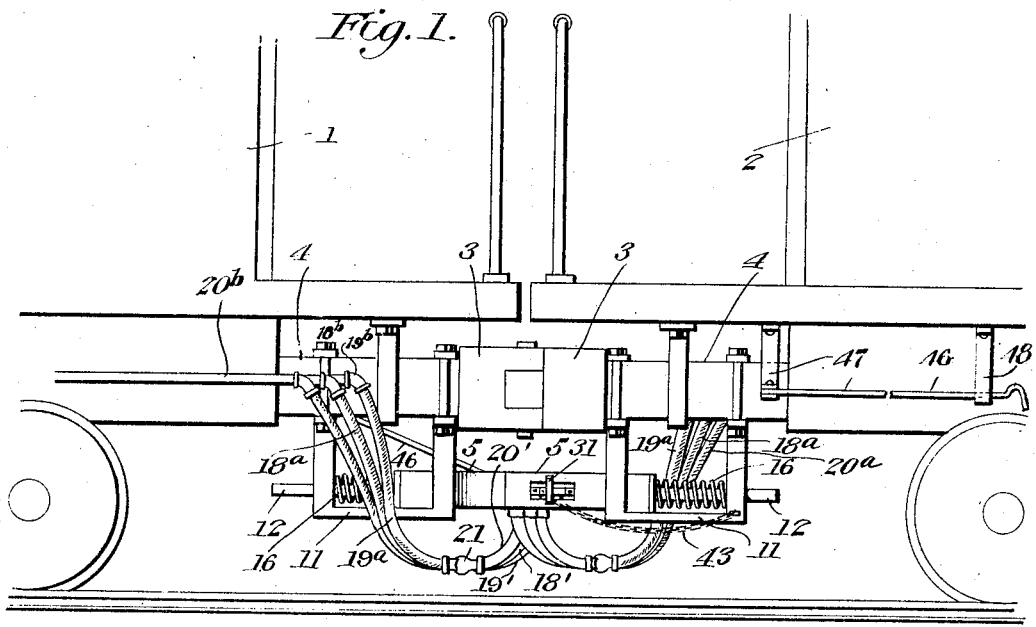

UNITED STATES PATENT OFFICE.

OTIS B. KENT AND CHARLES W. WATERS, OF WASHINGTON, DISTRICT OF COLUMBIA, ASSIGNORS OF ONE-THIRD TO CHARLES F. FORSYTH, OF WASHINGTON, DISTRICT OF COLUMBIA.

TRAIN-PIPE COUPLING.

1,112,144.  Specification of Letters Patent.  Patented Sept. 29, 1914.

Application filed June 5, 1913. Serial No. 771,950.

*To all whom it may concern:*

Be it known that we, OTIS B. KENT and CHARLES W. WATERS, both citizens of the United States, residing at Washington, in the District of Columbia, have invented certain new and useful Improvements in Train-Pipe Couplings, of which the following is a specification.

Our invention relates to hose or pipe couplings, comprehending particularly the production of a hose coupling designed for the connection of air, steam and signal hose or the like between railway cars, and adapted for securing an automatic coupling of train line pipes in position for coöperative communication when such cars are mechanically coupled together.

The primary object of the invention is to provide a coupling for uniting one or more hose line connections, which coupling is universally mounted for free movements in all directions in conjunction with a coacting coupling, to allow and compensate for the relative movements of coupled cars, the construction being such as to permit the maximum practicable variation, vertically, horizontally and longitudinally, between opposing couplers, as well as thereby to secure the union of such coupler sections under all circumstances in which the car couplers may be operated, and also to insure the perfect registration of the fluid conducting lines of one car with those of another.

A further object of the invention is to provide a coupler which is interchangeable for use with others of its kind, adapted to allow a proper cushioning action in the coupling operation and a desired degree of endwise motion outwardly to prevent ruptures, due to coupling, uncoupling and other relative longitudinal movements of the cars, and which is designed to be manually thrown into and out of action without the necessity of trainmen going between cars.

A still further object of the invention is to provide a novel type of universal joint for permitting flexion of the coupler, to provide novel means whereby the coupler heads may be moved into coupling position without a locking action or registration of the fluid connecting lines, and to provide means whereby coacting coupler sections may be manually locked against disengagement and the fluid conducting lines simultaneously brought into operative connection.

A still further object of the invention is to provide couplers having conducting unions or junction members relatively adjustable for locking and connecting action through the medium of a manually or automatically operable lever, together with means for locking the lever in thrown position and effecting the release of the lever for an uncoupling action of the fluid line connections when the cars are intentionally or accidentally uncoupled.

A still further object of the invention is to provide coupling devices for the purpose described which are simple of construction, reliable, positive and efficient in action, adapted to automatically cut off the escape of air when the coupling members are disconnected, and capable of permitting connection between the fluid conducting lines of a car provided with the improved fluid coupling or with the fluid conducting lines of a car provided with an ordinary type of fluid line coupling.

With these and other objects in view, the invention consists of the novel features of construction, combination and arrangement of parts, hereinafter fully described and claimed, reference being had to the accompanying drawings, in which:—

Figure 1 is a side elevation of the adjoining ends of two mechanically coupled cars, showing also the application of the invention thereto, with the hose couplers united; Fig. 2 is a top plan view, partially in horizontal section, of the united hose couplers; Fig. 3 is a vertical transverse section through the united hose couplers on the plane indicated by the line 3—3 of Fig. 2; Fig. 4 is a perspective view of one of the hose couplers, showing the shank and socket plate disconnected therefrom; Fig. 5 is a perspective view, partially in section, of one of the junction or union blocks and the associated controlling and locking lever; Fig. 6 is a perspective view of a coacting keeper plate; and Fig. 7 is a detail section through the mated junction or union blocks, illustrating a feature of construction.

Referring to the drawings, 1 and 2 designate the adjoining ends of two coupled cars, united by the mechanical couplers 3 carried by the respective draw-bars 4. These mechanical couplers may be of any of the ordinary types in common use, and constitute no part of the present invention, except in so far as their use as supports for the hose line couplings is concerned.

Each hose line coupling comprises a metal body, head or spoon 5, one of which is attached, as hereinafter described, to each end of a car. Each body, head or spoon is provided with surfaces adapted for interengagement with a coacting coupling when two coupling members are brought longitudinally together, which surfaces permit the coupling members to move longitudinally into and out of coupling engagement, while connecting them for vertical and lateral motions in unison and holding them from separation under such motions.

The engaging surfaces of coacting couplers upon the adjoining ends of cars include vertical longitudinal abutment faces 6, and opening through the said face 6 of each coupler section 5 is a chamber or recess 7, within which chamber or recess is arranged a laterally slidable junction or union block 8. The junction or union blocks of connected hose couplings are adapted for locking the couplings against longitudinal disconnection, except when the mechanical couplings 3 separate, as well as to form bridging conductors for uniting the fluid line conductors upon the adjacent cars, as hereinafter fully described. Each coupling member 5 is provided at its rear or inner end with a vertical slot or opening 9 engaging a retaining and fulcrum pin or like element 10 upon a supporting or suspension frame 11, said slot being tapered or gradually widened in a direction toward its forward end whereby the head or member 5 is permitted to have free longitudinal sliding and as well as lateral swinging motions, and to assume angular positions to compensate for and adapt the coupler to the vertical, longitudinal and horizontal or lateral transverse movements of the cars when such cars are in motion. A shank 12 is slidably mounted in the rear portion of the frame 11 and provided at its outer or forward end with a ball or head 13 engaging an approximately spherical socket 14 in the rear end of the member 5, which ball or head is retained in position by a socket closing or retaining plate 15 suitably fastened to the head, whereby the head and shank are held united and are universally adjoined for relative motions in all directions. A coiled spring 16 engages the shank between the plate 15 and the rear end of the frame and performs the several functions hereinafter fully described. In practice, the supporting or suspension frames 11 of the fluid line couplings of cars are suitably secured to the draw-bars 4 of the mechanical couplers 3, so as to support the fluid line couplers beneath such mechanical couplers and at a proper elevation above the track bed, whereby the fluid line connectors or couplers are adapted to move freely and coördinately with the mechanical couplers 3, as will be readily understood.

The junction or union blocks 8 of coacting members 5 normally lie wholly within the chambers or recesses 7 of the heads 5, and with their coacting abutment faces 17 flush with the abutment surfaces 6. Each union or junction block is provided with one or more ducts or passages for the flow of fluid therethrough. In the present instance we have shown each of said junction blocks or unions provided with three passages 18, 19 and 20, respectively, which may be employed for the passage of air for brake service, steam or hot water for heating or other purposes, and air or other fluid for signaling service, which ducts or passages communicate respectively with hose branches or termini 18', 19' and 20', adapted for engagement by ordinary gravity lock-joint coupling connections 21 with hose pipe sections 18$^a$, 19$^a$ and 20$^a$ connected with the air, steam and signal line pipes 18$^b$, 19$^b$ and 20$^b$ extending along the car. In the event that a car provided with the improved fluid line coupler is mechanically coupled to a car not so provided, the lock-joint couplings 21 permit of the disconnection of any of the hose termini from the hose pipe, and their direct locking connection with the lock-joint couplings of the hose termini upon the latter-named car, thus rendering the fluid line connections capable of service in conjunction with cars equipped with the present invention or any equivalent fluid line coupling, or with the fluid line couplings of cars of ordinary type, as will be readily understood. The hose termini 18', 19' and 20' are threaded or otherwise secured into the bottom of the junction or union block 8 in register with the respective passages and are slidable in slots 22 in the bottom wall of the chamber 7 for adjustment with the block. When two fluid line couplers come into engagement, the junction or union block upon either one of them may be moved outward laterally beyond the abutment face 6 of the coupler 5 to which it is attached and into the recess or chamber 7 of the other coupler 5, thus forcing the coacting union or junction block 8 in the latter-named coupling to recede into its chamber 7, whereby the first-named union or junction block bridges the abutment surfaces 6 of the two couplers, thereby locking them against longitudinal disconnection, as fully shown in Fig. 3, and at the same time bringing the respective ducts or passages of the mating union or junction blocks into registration. The abutment faces 17 of the union or junction blocks are counter-bored to receive gaskets 23 of rubber or other suitable elastic material, to effect the production of fluid-tight joints, and to adapt these gaskets to be at all times brought into accurate register. The abutment faces 17 of the coacting union or junction blocks may be provided with interengaging dowel pins or projections 24 and recesses or dowel seats 25, which are preferably tapered longitudinally in order to insure a positive guiding contact between them and the bringing of the mating portions into accurate coincidence when the union or junction blocks are moved into engaging relation. It will thus be understood that two cars may be mechanically coupled, without coupling the fluid line connections, and that when the fluid line connections are joined by the outward adjustment of one or the other of the union or junction blocks, the fluid line connections will be brought into sealed registration, while at the same time the fluid line couplers will be locked as described against longitudinal separation.

In order to provide for the automatic closing of the ducts or passages in the union or junction blocks when the fluid line couplings are separated, and the opening of said ducts or passages for intercommunication when the fluid line couplings of adjoining cars are brought together, each duct or passage in each union or junction block may be provided with an automatic controlling valve, whereby loss or leakage of fluid will be prevented and a consequent automatic setting of the brakes obviated. In the present instance, for the purpose of illustration, a valve of the character described is shown in each junction block for controlling the duct or passage 18 constituting a part of the air-brake system, a valve 26 being shown as adapted to control a port 27 and carried by a sliding stem 28. When the coupling is not in use, the valve 26 is normally closed by the pressure of the fluid behind it, but the stems 28 are of such length and so arranged that when the union or junction blocks of two couplers are brought together the valve stems within such blocks will abut, causing the stems to slide inwardly and to move the valves out of engagement with their seats, thus opening communication between the registering ducts 18, for the flow of the brake fluid from one car to another. When the junction blocks are separated, the valves automatically close under the pressure in the train line, thus cutting off the escape of fluid.

The junction blocks are normally held retracted and out of engaging position for the reason that in yard movements generally and in the hauling of disabled cars it is undesirable that the gaskets at the coupling points should impinge upon one another, it being preferable that a manual operation rather than automatic means be employed to finally lock the gaskets for the union of the coupling members preparatory to the charging of the train line. For the purpose of adjusting each junction or union block 8 into and out of locking and engaging position, a setting or adjusting and locking lever 29 is provided. This lever is fulcrumed upon the head 5, as at 30, to swing in a direction longitudinally of the car in a desired arc of motion, and said lever is provided at its outer end with a handle 31 and at its inner end with curved or arcuate arms 32 (one or more) which extend through slots in the outer face of the head 5 into the chamber 7 and loosely engage slots 33 in the adjoining face of the block 8, the free ends of said arms being provided with pivot pins 34 slidably and pivotally engaging slots 35 in the block, whereby through prescribed forward and backward movements of the lever, the block may be adjusted outwardly and inwardly transversely of the head 5, the slot and pin connections 34 and 35 permitting of the desired angularity of motion between the lever and junction block. The lever 29 normally extends outwardly parallel with the end of the car with the handle 31 in position to be manipulated at the adjacent side of the car, thus avoiding the necessity of a trainman passing between the cars in the coupling and uncoupling actions. The lever is longitudinally bored or chambered to receive a longitudinally sliding locking bolt, rod or pin 36, the outer end of which terminates in a handle 37 inclosed within the space bounded by the handle 31 and the inner end of which is adapted for engagement with openings 38 and 39 in a keeper plate or member 40 to lock the lever in retracted or thrown position. A coiled-spring 36$^a$ is provided within the lever to normally project the bolt into locking position. The plate 40 is fitted within a recess in the outer side of the head 5 and is provided at its ends with slots 41, through which securing screws 42 pass and enter threaded openings in the head 5, the slots 41 permitting adjustment of the plate to vary the positions of the openings 38 and 39 to enable the adjustments of the lever 29 to be varied to adjust the block 8 to different degrees to compensate for any wear, due to long service, upon the gaskets or abutment faces of junction blocks in order that at all times a perfect union between coacting junction blocks may be obtained. A chain or like flexible connection 43 passes around a guide pulley or sheave 44 on the lever and is connected at one end to a bracket 45 on the locking bolt 36 and at its opposite end to the suspension or supporting frame 11, whereby an automatic retraction of the lever and junction block may be effected when coupled cars are mechanically uncoupled.

Normally the spring 16 holds the head 5 projected forwardly in position to engage a coacting head, and in such normal position the junction block is retracted and the rear end wall of the opening 9 abuts against the fulcrum and retaining pin 10 and the chain 43 hangs to a certain extent slack. In this position the bolt 43 engages the opening 38 in the keeper plate 40 and locks the lever in retracted position against casual displacement. When two coupling members 5 come together, the said coupling members recede to a certain extent, as shown in Fig. 2, to permit of the coupling action, the shock of impact being cushioned by the springs 16, which maintain the coupling members in engagement against longitudinal separation to any wide range of extent at all times while the cars are mechanically coupled together. The handle of one of the levers 29 is then grasped by the trainman who simultaneously draws upon the handle 37 to release the locking bolt 36 from the opening 38 and swings the lever thus released forwardly until the bolt engages the opening 39, whereby the junction or union block connected with said lever will be moved beyond the abutment face 6 of the coupling to which said lever is attached and into the chamber or recess 7 of the other coupling member, thus bridging and locking said coupling members against longitudinal movement to any degree, while at the same time adjusting said union block into engagement with the coacting union block to cause the gaskets to abut and connect the ducts in the union blocks for service, communication being automatically established in the manner previously described. The chain 43 connected with the thrown or adjusted lever 29 will thus become taut while the chain of the other lever remaining in normal position is slack, so that in the event of the separation of the mechanical couplings 3, a resulting pull upon the taut chain 43 will ensue, thus retracting the locking pin of the thrown lever and moving said lever back to normal position, thereby retracting the projected union or junction block and breaking the fluid line connections while at the same time releasing the coupling heads 5 from disengagement to avoid liability of injury thereto. At all times while a pair of coupling members 5 are connected, the sliding and pivotal connections between said coupling members and their suspension frames 11, their universal joint connections with the shanks 12 and the action of the springs 16 will permit said coupling members to have a wide range or amplitude of motion in all directions to conform to and compensate for the relative motions between the ends of the cars when the cars are in motion, whereby a perfect union at all times of the train line connections is maintained and liability of damage to the train line couplings obviated.

From the foregoing description, taken in connection with the accompanying drawings, the construction and mode of operation of our improved train line pipe or hose coupling will be readily understood, and it will be seen that a coupling of the character described is provided which effectually performs the functions for which it is designed, and which is freely flexible under all running conditions of the cars, while adapted to maintain perfect physical union, and which furthermore, is designed to admit of the instant release of connected couplings when the mechanical couplings become casually separated or otherwise mechanically separated or disabled in such a way as to break the physical connection between the cars. It will further be seen that the invention provides a coupling which insures a tight connection between the gaskets, an adjustment of the union members to compensate for wear, and a reliable locking action to hold the fluid line couplings securely against disconnection while in service. The invention furthermore embodies the desirable advantage of permitting two cars to be mechanically coupled without at the same time coupling the fluid line connections, a desideratum in shunting or switching cars in short hauls in a yard or between tracks of a main line, thus avoiding wear and tear on the gaskets and other parts of the equipment when the cars are not to be coupled for running service or any considerable period of time and where the use of air brakes and other fluid line connections are not necessary or essential. Finally, the invention provides a simple, reliable and efficient type of fluid line coupling, which may be applied to existing cars without changes or modifications in the construction thereof, which will permit coupling of the fluid connections with a car unequipped with the invention and having the ordinary fluid line couplers, and which permits of the ready replacement or repairs of parts when required.

It is of course obvious that suitable means may be employed to render the locking as well as the unlocking of the junction or union blocks automatic and that other changes falling within the scope of the appended claims may be made without departing from the spirit of the invention or sacrificing any of the advantages thereof.

While it is primarily intended and deemed of advantage to adjust the junction or union blocks manually for an interlocking and fluid coupling action, suitable means for controlling the lever 29 for an automatic locking and releasing action may be employed to meet requirements of this character. To this end, we may provide a link rod 46, jointed at one end, as at 47, to the side of the car, and adapted when not in use to be swung back and held in a keeper 48. The opposite end of the rod is adapted for detachable connection with a fastening member 49 on the lever 29, so that the rod may be coupled to the lever for use or uncoupled therefrom, as occasion requires. When the rod is applied for use, the lever is held, when in retracted position, a little in advance of the retracted position hereinbefore specified, with the bolt 36 retracted and its locking end arranged to impinge for sliding motion on the keeper 40 at a point just in advance of the opening 38. Hence when the coupler is forced back the lever 29 will be held stationary by the rod 46 and will accordingly be given a relative forward movement, by which the block 8 will be projected. For an automatic releasing action the rod may be employed and relied upon to effect a relative adjustment of the lever in an obvious manner as the coupler moves outwardly, in which event a suitable connection between the rod and bolt will be employed to retract the latter, or the chain 43 may be relied upon to perform such functions, as will be readily understood.

Having thus described our invention, what we claim is:—

1. In a connector of the character described, a coupling member having means for coöperative connection with a coacting coupling member, said coupling member being provided with a slot, a support carrying a fulcrum and retaining element loosely engaging said slot, a sliding element carried by said support, a universal joint connection between said coupling member and sliding element, and a cushioning spring associated with said sliding element and yieldingly backing said coupling member.

2. In a connector of the character described, a coupling member having a lateral abutment face, a union normally disposed within the plane of said abutment face and projectable and retractable in a plane transversely of the coupler, and a manually operable lever for adjusting said union.

3. In a connector of the character described, a coupler member having a lateral abutment face, a union having a fluid duct and normally arranged within the plane of said face and projectable inwardly and outwardly relative to said plane, and manually operable lever for adjusting said union, and means for locking said lever in adjustable position.

4. In a connector of the character described, a coupler member having a lateral abutment face, a union having a fluid duct and normally arranged within the plane of said face and adjustable transversely inwardly and outwardly relative to such plane, means for adjusting said union, and means for locking the adjusting means in adjusted position.

5. In a connector of the character described, a coupler member having a lateral abutment face, a union having a fluid duct and adjustable inwardly and outwardly transversely of the coupling member with relation to the plane of said face, a controlling device for adjusting said union, means for locking said controlling device in adjusted position, and means for releasing the locking means automatically in a determined phase of operation.

6. In a connector of the character described, a coupler member having a lateral abutment face, a union having fluid duct and movable inwardly and outwardly transversely of the coupling member with relation to the plane of said face, a pivotally mounted lever for adjusting said union, means for locking said lever in adjusted position, and an element connected with the locking means for releasing the same and returning the lever and union to retracted position in a determined phase of operation.

7. In a connector of the character described, a coupler member having a lateral abutment face and a chamber or recess opening therethrough, a union having a fluid duct and positioned within said recess or chamber, said union being movable inwardly and outwardly with relation to the plane of said abutment face, a lever for adjusting said union, a locking device carried by the lever for locking the same in adjusted positions, and a controlling connection acting upon said locking device for retracting the lever and union under prescribed conditions.

8. A fluid line coupler having a manually operable fluid conductor movably mounted thereon, said conductor forming a locking element to engage a coacting coupler.

9. A fluid line coupler having a locking element movably mounted thereon and forming a fluid conductor, and means for automatically throwing the same into and out of locking position.

10. A fluid line coupler having a locking element movably mounted thereon and forming a fluid conductor, and means for manually or automatically moving the same into an out of locking position.

11. A fluid line coupler adapted for physical engagement without interlocking action with a coacting coupler, and manually operable fluid conducting means for interlocking said couplers.

12. In a connector of the character described, a coupling member adapted for physical engagement without locking connection with a co-acting coupling member, a combined fluid conducting and locking device movably mounted thereon, and means for manually projecting and retracting said locking device.

13. In a connector of the character described, a coupling member adapted for physical engagement without locking connection with a co-acting coupling member, a combined fluid conductor and locking member movably mounted thereon, manually operable means for projecting and retracting said fluid conducting and locking member, and means for setting said manually operable means for an automatic action.

14. In a connector of the character described, a coupling member adapted for physical engagement without locking connection with a co-acting coupling member, a combined fluid conducting and locking element movably mounted thereon, manually operable means for projecting and retracting said fluid conducting and locking element, and a locking means for locking said manually operable means in adjusted position.

15. In a connector of the character described, the combination of co-acting coupling members having lateral abutment faces and adapted for physical engagement without interlocking connection, transversely movable fluid conducting and locking elements upon said coupling members, means for adjusting either of the said fluid conducting and locking elements for interlocking engagement between the coupling members to hold them from longitudinal separation and for bringing the fluid passages thereof into registry, and valves upon said fluid conducting and locking elements normally held closed and adapted when the said elements of co-acting couplers are brought together to be opened for a fluid line connection.

16. In a connector of the character described, a coupling member having a lateral abutment face, a fluid conducting and locking element movable transversely of the coupling member with relation to said abutment face, a manually operable lever for adjusting said element in and out, a locking device carried by the lever for engagement with the coupler member to hold said lever in adjusted position, and means upon said lever for manually controlling said locking device.

17. In a connector of the character described, a coupler member having a lateral abutment face, a combined fluid conductor and locking element movable transversely of said member with relation to said abutment face, a lever for adjusting said element, said lever having an operating handle, a locking bolt on the lever for engagement with the coupler member to lock the bolt in adjusted position, and a handle for retracting the bolt, said handle being disposed with relation to the handle of the lever so that the locking bolt may be retracted by the hand gripping the lever handle and the lever then adjusted.

In testimony whereof we affix our signatures in presence of two witnesses.

OTIS B. KENT.
CHARLES W. WATERS.

Witnesses:
C. C. HINES,
BENNETT H. JONES.

Copies of this patent may be obtained for five cents each, by addressing the "Commissioner of Patents, Washington, D. C."